Figure 1:
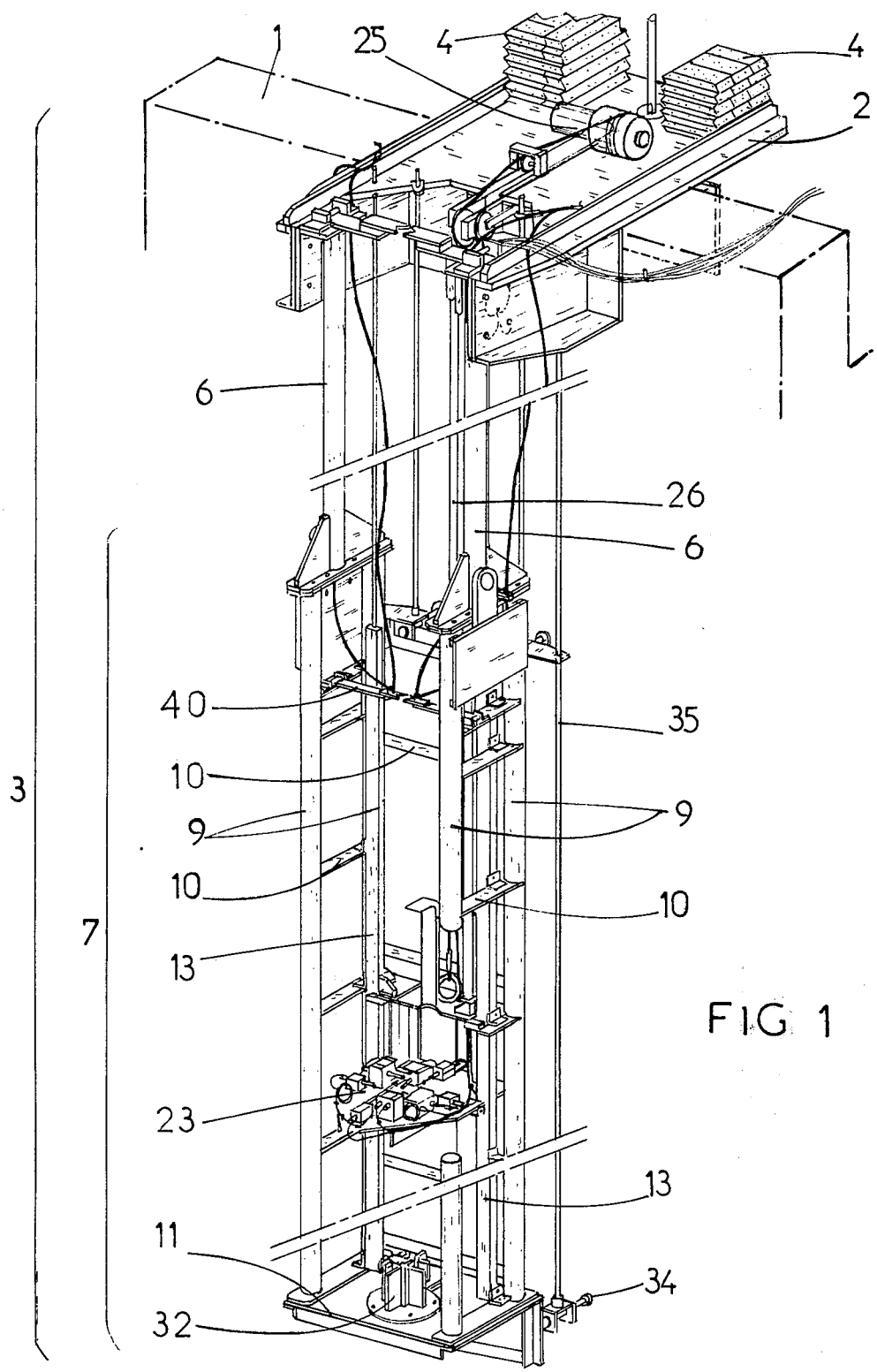

United States Patent [19]

Weilbacher

[11] 4,048,009
[45] Sept. 13, 1977

[54] METHOD OF AND APPARATUS FOR CHECKING THE DIMENSIONS OF THE EXTENSIONS OF THE CONTROL RODS OF A NUCLEAR REACTOR

[75] Inventor: Jean-Claude Weilbacher, L'Isle Adam, France

[73] Assignee: Societe France-Americaine de Constructions Atomiques-Framatome, Courbevoie, France

[21] Appl. No.: 664,639

[22] Filed: Mar. 8, 1976

[30] Foreign Application Priority Data

Mar. 14, 1975 France .................. 75.08010

[51] Int. Cl.² ........................................... G21C 17/00
[52] U.S. Cl. ............................... 176/19 R; 33/174 P
[58] Field of Search ............ 176/19 R; 33/125 M, 33/141 R, 174 P, 174 L

[56] References Cited

U.S. PATENT DOCUMENTS

| | | | |
|---|---|---|---|
| 3,480,510 | 10/1969 | Anthony | 176/86 |
| 3,511,091 | 5/1970 | Thome | 176/19 R |
| 3,596,362 | 8/1971 | Reason | 33/174 P |
| 3,621,580 | 10/1971 | Tovaglieri | 33/174 P |
| 3,664,922 | 5/1972 | Diwinksky et al. | 176/30 |

OTHER PUBLICATIONS

Trans. Am. Nuc. Soc., vol. 8, (4/11/65) p. 584, Barden.

*Primary Examiner*—Samuel W. Engle
*Assistant Examiner*—S. A. Cangialosi

[57] ABSTRACT

A method of checking the dimensions of the extensions of control rods of a nuclear reactor when the extensions are located in a cooling pit or fuel storage pool under a safe depth of water, comprising placing each extension vertically on a reference support in the cooling pit, the support having a profile corresponding to that of the extensions, moving measuring pick-ups, calibrated by reference to the support, along the extension, measuring the distances between the pick-ups and the extension at a plurality of levels, and analyzing the measurements. An apparatus is also disclosed for performing the novel method of checking rod-extension dimensions in the nuclear reactor.

5 Claims, 2 Drawing Figures

METHOD OF AND APPARATUS FOR CHECKING THE DIMENSIONS OF THE EXTENSIONS OF THE CONTROL RODS OF A NUCLEAR REACTOR

The present invention relates to a method of and an apparatus for checking the dimensions of extensions to control rods of a nuclear reactor during periodical preventive maintenance checks.

The extensions to the control rods are straight elements, generally of cruciform cross-section, which extend the control rods and are dropped between the combustible assemblies in the core of a nuclear reactor to moderate the activity of the reactor.

During operation of the reactor the extensions are exposed to radiation and to very high temperatures which can cause deformations. As the extensions are safety elements which must be located quickly between the combustible assemblies if need arises, any excessive deformation of the extensions could have grave consequences. It is therefore important to be able to check the straightness of the extensions with great care and precision. Such checks are carried out during a shut-down of the reactor, but, as the extensions are radioactive, they must be examined in a cooling pit or fuel storage pool, i.e. under a great depth of water.

At the moment the extensions are periodically examined by suspending each extension from its upper end in the cooling pit and hanging a weighted line, like a plumb-line, against it. It will be appreciated that in such circumstances it is extremely difficult to detect deformations, as the latter can only be seen as a deviation from parallelism of the line and the rod, and this through a great thickness of water. Moreover, this method does not enable small local deformations to be detected, and these could be the start of more serious deformations if the extension were kept in service.

It is an object of the present invention to provide a solution to the above problem and to enable examination and precise dimensional measurements to be made over the whole lengths of the extensions, while maintaining the protection that is provided by the water of the reactor cooling pit or fuel storage pool.

In accordance with one aspect of the invention, there is provided a method of checking the dimensions of control rod extensions of a nuclear reactor in a cooling pit or pool and under a safe depth of water, the method comprising:

a. placing each extension to be checked vertically in the cooling pit on a reference support having a profile analogous to that of the extension, b. moving measuring pick-ups vertically along the support to calibrate the pick-ups, and then along the extension, to measure the distances between the pick-ups and the extension at various levels, and c. analysing the obtained measurements.

In acordance with another aspect of the invention, there is provided apparatus for checking the dimensions of control rod extensions of a nuclear reactor in the cooling pit or pool and under a safe depth of water, the apparatus comprising:

a. a vertical structure adapted to be removably suspended from the lip of the cooling pit and comprising:
　an upper section adapted to be removably attached to the lip and forming an auxiliary floor,
　an intermediate section, the height of which is at least equal to the safe depth, and
　a lower section, comprising vertical guide means, a support at the lower end having a profile analogous to that of the extensions and for receiving the lower end of an extension placed vertically in the structure, means for centering the lower end of the extension resting on the support, and means for centering the upper end of the extension in the structure, b. a measuring carriage carrying measuring pick-ups and movable along the vertical guide means between a low position in which the pick-ups are below the end of the extension resting on the support, and a high position corresponding to the upper end of the extension, c. means for moving said carriage between said low and high positions and for stopping the carriage, and d. a readout system located outside the cooling pit and connected to the pick-ups to receive data therefrom.

The invention will be more fully understood from the following description of an embodiment thereof, given by way of example only, with reference to the accompanying drawings.

Figure 2:
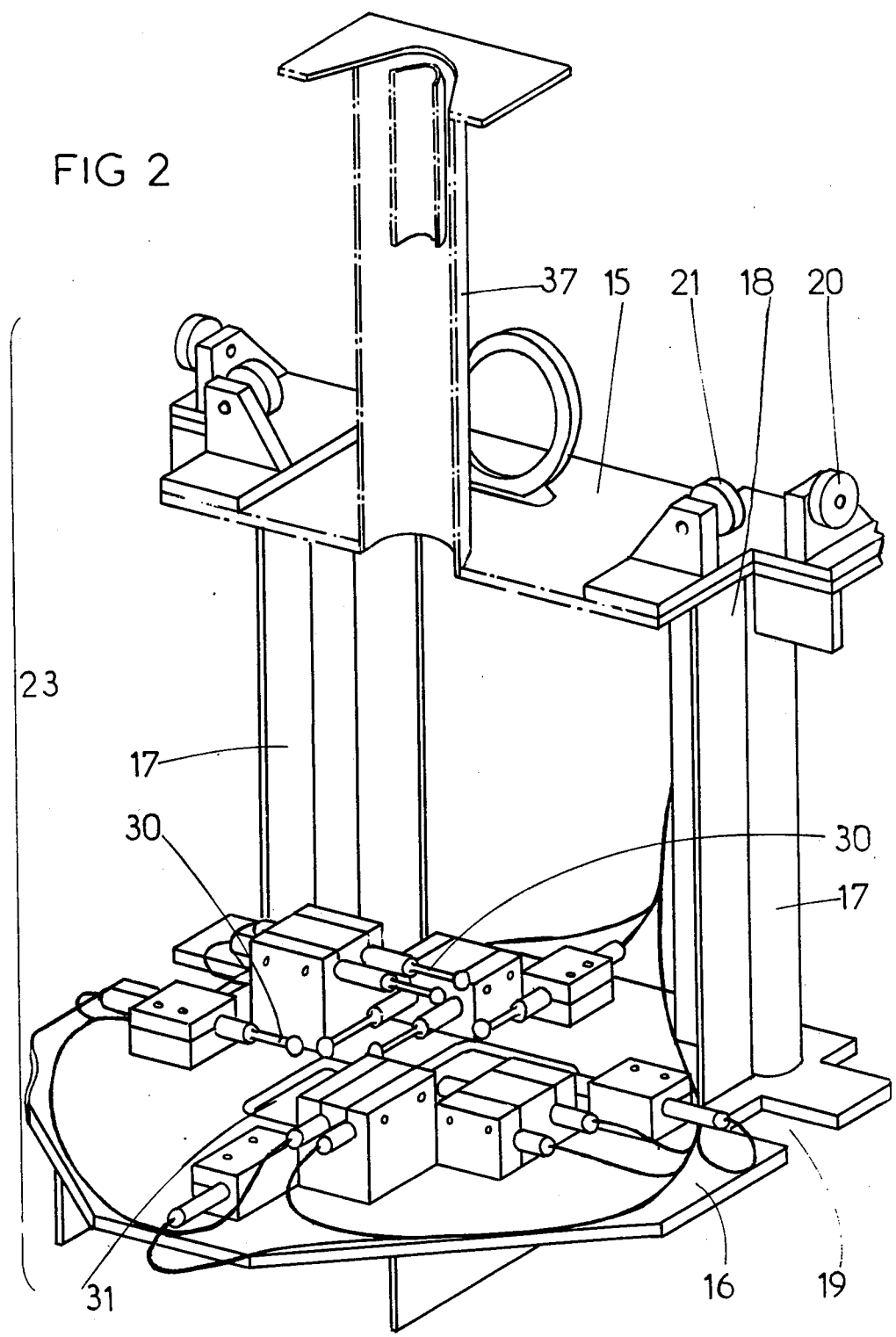

In the drawings:

FIG. 1 is an overall view of an embodiment of apparatus according to the invention installed on a lip of a cooling pit or fuel storage pool of a nuclear reactor; and FIG. 2 is a perspective view to a larger scale of part of the apparatus of FIG. 1.

Referring first to FIG. 1, the exemplary apparatus comprises a rigid vertical structure 3 of generally tubular form, which is suspended in the cooling pit or pool of the reactor and supported on a lip 1 of the reactor, shown in chain-dotted line. A support element 2 straddles the lip 1, with two cantilevered parts, one extending towards the inside of the cooling pit and supporting the vertical structure 3 itself, and the other extending towards the outside of the cooling pit and being balanced by counterweights 4. The upper part of the vertical structure 3, consisting mainly of vertical tubes 6, in practice acts only as an extension for a lower working part 7 in which the irradiated extensions are placed and protected by an adequate depth of water in the cooling pit.

The lower part 7 of the vertical structure 3 consists of four tubes 9 which are rigidly cross-braced by cross-pieces 10 and by a lower platform 11. This rigid framework supports two vertical rails 13 which are machined on three sides.

The rails 13 serve to guide a movable carriage designated generally 23 and shown in more detail in FIG. 2. The carriage consists of two plates 15, 16 connected together by uprights 17. To simplify the drawing the plate 15 is shown partially cut away, so that certain accessories mounted on this plate are not visible. The rails 13 pass through notches 18 in the upper plate 15 and notches 19 in the lower plate 16. Rollers 20 and 21 on the upper plate act as guides. A supplementary set of rollers (not shown), forming pairs with the rollers 20, bear on the third faces of the rails 13. Similarly, the lower plate 16 comprises a like set of rollers also bearing on the rails 13, but which are not shown in the drawing.

The movable carriage 23 has its movements controlled from a driving drum 25 located on the support element 2 and around which are wound drive cables 26. The drum 25 is driven by a conventional motor-gearbox unit. The lower platform 16 of the carriage 23 supports several sets of measuring pick-ups 30 arranged in accordance with the profile of the extensions to be examined.

The pick-ups are devices of known type, designed to measure the distance between the pick-up head and an object in the vicinity of the head, for example magnetically, ultrasonically, by electrical capacitance effect, or by any other suitable known method. An orifice 31 is cut in the centre of the platform 16 of the carriage, with an outline which reproduces, with adequate clearance, the profile of the cross-section of the extensions to be examined. Finally, the lower platform 11 includes a support 32 with a cross-section analogous to that of the extensions.

The whole structure 3, with the movable pick-up carrying carriage 23, is mounted against one wall of the cooling pit or fuel storage pool, and held to the lip 1 to which the support element 2 is fixed by means of clamping rams (not shown). The verticality of the assembly against the wall is regulated by means of adjustable rams 34 which are controlled from the part above the lip by means of transmission rods 35.

When the equipment is in position, the connections to the pick-ups 30 are all gathered into a bundle and placed in a chute 37 fixed to the upper plate 15 of the carriage and held by the cables which move the carriage up and down. When it is necessary to examine an extension to check its dimensions and detect possible deformations, the carriage 23 is first lowered to the lowest point on its path of movement, in which position it surrounds the support 32 which projects through the opening 31 in plate 16.

By means of a normal overhead gantry, an extension removed from the core and already held in readiness in a storage rack is taken up and placed vertically on the support 32, without leaving the cooling pit or pool. The support 32, which has the same profile as the extension, includes centering means which enable the extension to be located exactly in line with the support. When the extension is centered in this way on the lower support 32, its upper part is also centered by means of supports 40 which are vertically disposed in the ready position and which swing down horizontally to grip the upper part of the extension.

The extension is then held at both its upper and lower ends, and can be disengaged from the handling device used to position it in the inspection apparatus. In this position the extension and the lower support 32 form a continuous vertical bar along which the carriage 23 and the measuring pick-ups 30 can be moved. The pick-ups are first calibrated on the support 32 which acts as a reference, at a first lower zero level.

The support 32 includes calibration distance pieces with thicknesses varying by 2 mm from one level to the next, so that by bringing the carriage to the levels of the successive distance pieces it is possible to record the signals from the various pick-ups which correspond to the various reference thicknesses. After calibration, the carriage 23 is moved along the extension to various levels where it is stopped for read-out of the data provided by the pick-ups, which can then be translated into horizontal dimensions with reference to those of the reference support 32.

Depending on the accuracy required of the measurements, it is possible to carry out a variable number of measurements along the whole length of the extension. All these measurements are preferably recorded in a reading system located outside the cooling pit or pool, and an analysis of the measurements recorded at the various levels enables the profile to be accurately traced along the extension. It is possible to fully eliminate errors which might be caused by any error in centering the extension in the checking structure or in maintaining it vertical.

After making the required measurements at the various levels, the carriage is again lowered to the zero level i.e. below the plane in which the extension rests on the support 32, and the extension can then be removed from the checking apparatus by the usual handling means, after the upper centering elements 40 have been disengaged.

It will be seen that the apparatus and method which have just been described enable an exact dimensional check to be carried out on a rod extension in a nuclear reactor under the protection of the water in the cooling pit or pool. More particularly, the pick-ups can be so arranged that they make measurements inside the concave parts of the profile of the extension, which is impossible with the methods used hitherto. The beginnings of deformations can thus be detected in time and extensions removed from service before the deformations reach a critical size.

It will be understood that the invention is not limited to the embodiment which has been described by way of example, but also covers embodiments differing therefrom only in points of detail, in modified modes of execution, or in the use of equivalent means.

What is claimed is:

1. A method of checking the straightness of elongated control rod extensions of a nuclear reactor under deep water in a fuel storage pool of the reactor comprising the steps of:
   a. removably suspending a vertical structure from the lip of the storage pool, the structure including: an upper section removably attached to the lip, an intermediate section, a lower section including vertical guide members, and a support at its lower end having a profile analogous to that of each rod extension and for receiving the lower end of a rod extension when placed in the structure,
   b. substantially vertically aligning the rod extension with the support;
   c. centering the upper end of the rod extension in the structure;
   d. moving a measuring carriage carrying measuring pickups along said guide members between a low position in which said pick-ups are below the lower end of rests on said support, and a high position corresponding to the upper extension end;
   e. moving the carriage between the low and high positions,
   f. stopping the carriage;
   g. reading on a system outside the storage pool data received from the pickups.

2. An apparatus for checking the straightness of elongated control rod extensions of a nuclear reactor under deep water in a fuel storage pool of the reactor, comprising: a vertical structure removably suspended from the lip of the pool and including: an upper section removably attached to the lip and forming an auxiliary floor, an intermediate section, the height of which is at least equal to the depth of the water, and a lower section including vertical guide members, a support at its lower end having a profile analogous to that of each rod extension and for receiving the lower end of a rod extension when placed in said structure, the rod extension being substantially vertically aligned with said support, means for centering the upper end of the rod extension in said structure; a measuring carriage carrying measuring pick-ups and movable along said guide members between a low position in which said pick-ups are below the lower end of the rod extension as it rests on said support, and a high position corresponding to the upper extension end; means for moving said carriage between the low and high positions and for stopping said carriage; and a readout system outside the pool and connected to said pick-ups to receive data therefrom.

3. The apparatus as defined in claim 2, further comprising means for regulating the vertical position of said structure in the pool.

4. The apparatus as defined in claim 2, wherein said carriage substantially completely surrounds an element selectively constituted by the rod extension and by said support, and said pick-ups are arranged around said element.

5. The apparatus as define in claim 2, wherein said support includes distance pieces of different thicknesses for calibrating said pick-ups.

* * * * *